Nov. 8, 1966  F. E. IRWIN  3,283,786
ACCUMULATOR
Filed June 8, 1964  2 Sheets-Sheet 2
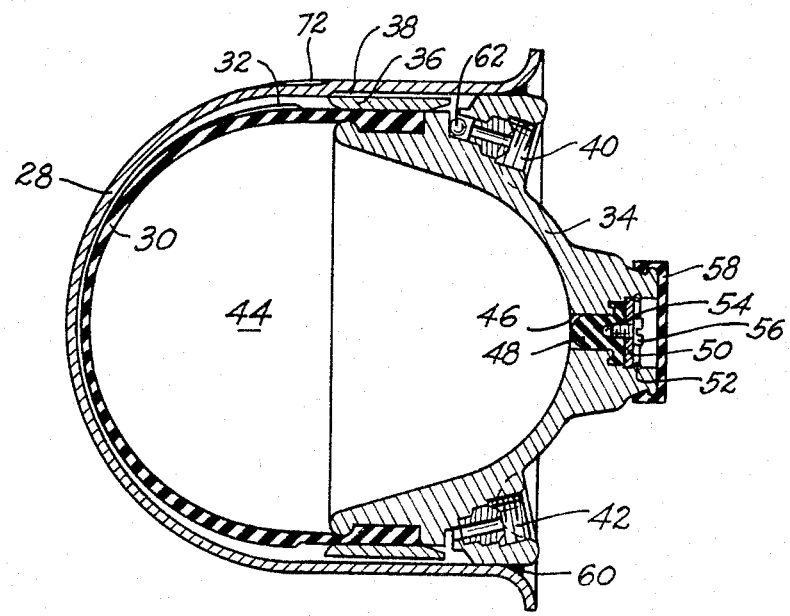
FIG_2
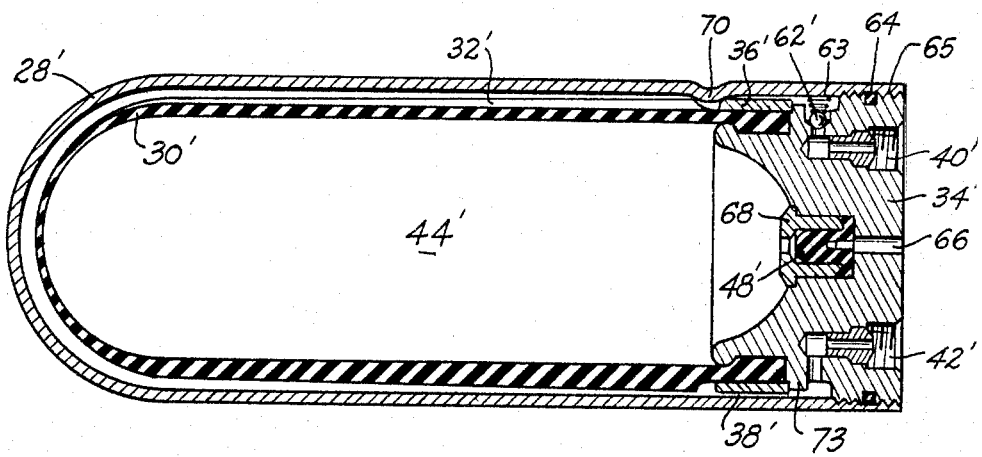
FIG_3
INVENTOR.
FRANCIS E. IRWIN.
BY
Richard G. Geib
ATTORNEY.

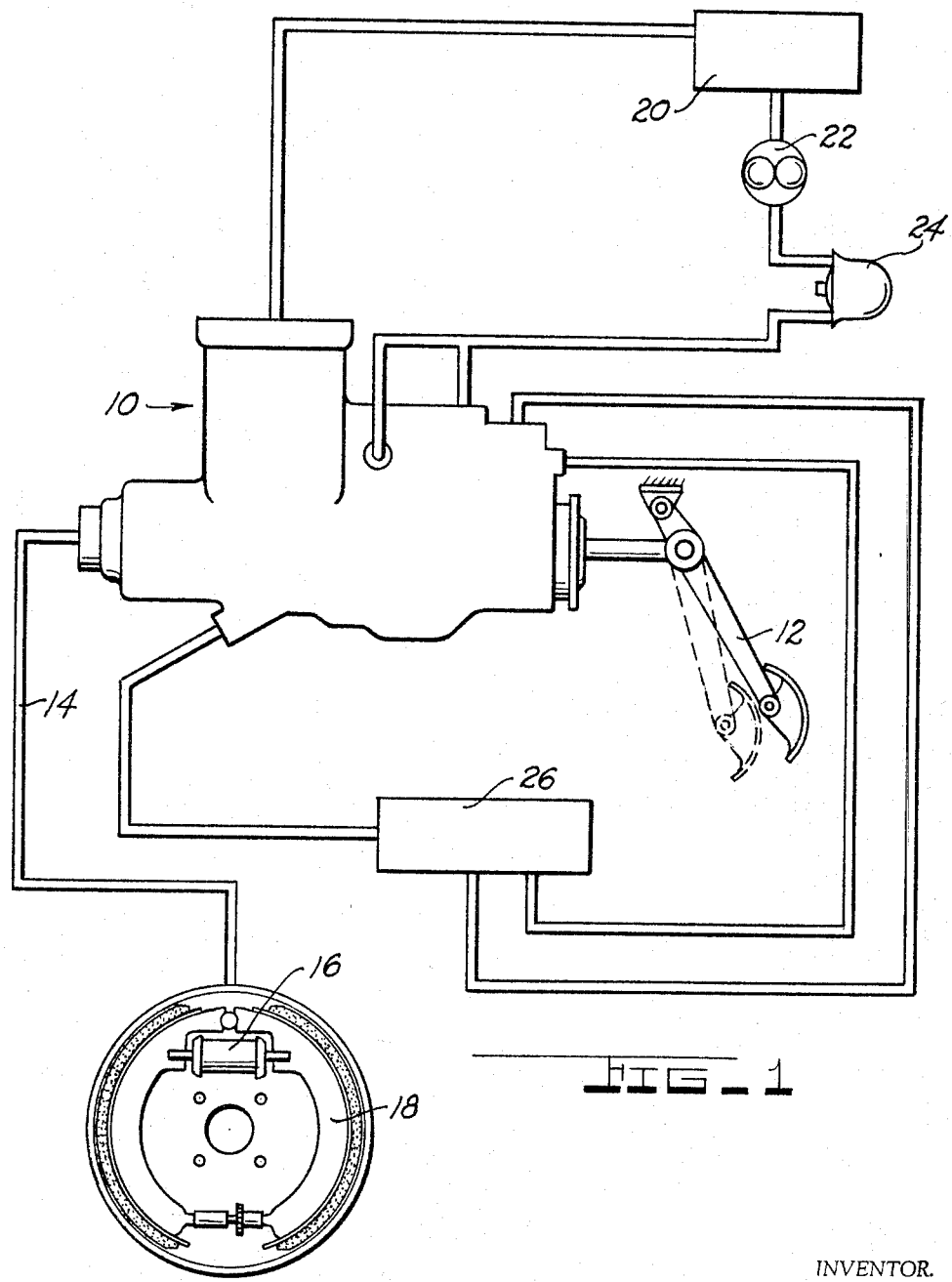
FIG_1
INVENTOR.
FRANCIS E. IRWIN.

United States Patent Office

3,283,786
Patented Nov. 8, 1966

3,283,786
ACCUMULATOR
Francis E. Irwin, South Bend, Ind., assignor to The Bendix Corporation, South Bend, Ind., a corporation of Delaware
Filed June 8, 1964, Ser. No. 373,344
8 Claims. (Cl. 138—30)

This invention relates to hydro-pneumatic energy storage devices, and more specifically to improvements in an accumulator of the bladder type.

Accumulators of the general type to which this invention relates may be used in automotive or aircraft hydraulic systems where many devices are operated from fluid under pressure from one pump. In these systems a power driven pump is continuously operated, but since the many devices may be operated intermittently the required liquid may be less or greater than the output of the pump. When the liquid demand is less than the pump output, liquid is stored under pressure in the accumulator, and when the accumulator is filled, the pump output is bypassed to a reservoir. When the liquid demand exceeds the capacity of the pump, the accumulator supplies the necessary liquid under pressure. Thus, one purpose of an accumulator is to permit the use of a small pump for a hydraulic system with momentary demands in excess of the capacity of the pump.

The hydro-pneumatic device to which this invention relates may also be adapted for use in vehicular air suspension systems.

Prior to the advent of this invention, accumulators with good operating characteristics were relatively expensive to fabricate or were too bulky or heavy. Those which were somewhat cheaper to fabricate often did not function properly, or were short-lived.

It is therefore an object of this invention to provide a compact, lightweight accumulator which is capable of being economically fabricated from sheet metal parts, is efficient in use, is composed of a minimum number of parts and is unlikely to become unserviceable. Another object of this invention is to provide an accumulator which has provisions for intake and discharge of a working fluid as well as a pressurized compressible fluid all at one end thereof.

It is a further object of this invention to provide means for isolating the working fluid in the accumulator from the pump means whenever the pressure in the accumulator exceeds that supplied by the pump.

It is a further object to provide an accumulator having an internal assembly that is preformed prior to installation within a shell so that it may be pretested.

The above and other objects and features of the invention will be apparent from the following description of the apparatus taken in connection with the accompanying drawings which form a part of this specification as follows:

FIGURE 1 is a schematic presentation of a power brake mechanism employing an accumulator in accordance with the principles of this invention;

FIGURE 2 is a cross-sectional view of an accumulator designed in accordance with the principles of my invention; and FIGURE 3 is a cross-sectional view of another form which the accumulator embodying the features of my invention may take.

As was suggested above, the accumulator in accordance with my invention may be utilized in one of many situations. However, I have shown it in a typical power brake system of the hydraulic type in order to show a highly commercial utilization for my invention.

More particularly, I show a power brake control valve and pressure intensifying means 10 having means for increasing or decreasing the travel of an associated brake pedal 12 in accordance with the principles of the invention described in the co-pending application Serial No. 255,807, now U.S. Patent No. 3,188,796, assigned to the common assignee. Particular details of this brake mechanism may be found in the aforesaid application. Suffice it to say, at this time, that it is capable of delivering and/or producing a pressurized fluid for a conduit 14 that supplies a wheel cylinder 16 of a vehicle brake 18.

The fluid supply for such a brake system comprises a fluid reservoir 20, a pump 22, an accumulator 24 and a pressure relief valve 26 that are connected together in a closed circuit by the appropriate conduits shown in schematic form of FIGURE 1.

With particular regard to the accumulator, attention is directed to FIGURE 2 showing a construction including an outer shell 28 and a bladder 30 having reinforcement, in the form of ribs 32 therearound, within the shell 28. The bladder 30 is held on an end closure means 34 by a band clamp 36 whose outer diameter is sized to provide a fluid passage 38 between the clamp and the inner walls of the outer shell 28. The end closure 34 is also provided with a fluid inlet 40 for the receipt of the fluid from the pump 22. The fluid then flows through passage 38 to the space between the bladder 30 and the shell 28 and thence out the discharge port 42. As seen, the bladder 30, that is joined to the end structure 34, prescribes a variable volume chamber 44. In order to inject a pressurized fluid into the chamber 44, I have provided a drilled opening 46 in the end means or structure 34 which I have closed by a rubber or similarly resilient plug 48 held in the opening by a washer 50 and snap ring 52. As seen, the plug 48 is partially drilled as at 54 for the receipt of a hollow needle (not shown) that is inserted through the plug 48 to charge the chamber 44. Upon removal of the hollow needle, the plug 48 will close off the chamber 44 and a setscrew 56 may be threaded through the washer 50 into the opening 54 to further insure sealing thereof. In order to prevent contaminants from entering the opening after the charging of the chamber 44, I have provided a cover 58 that is to be snap-fitted on the end structure 34, as shown. As a precautionary measure I have contemplated the use of a washer having a greater central opening to allow extrusion of the plug when extreme temperatures threaten the accumulator.

As seen in FIGURE 2, the end structure 34 is welded to the shell 28 as at 60. However, the use of welding as a method of joining the end structure to the shell is not considered to be the only method of joining, as will be explained hereinafter with reference to FIGURE 3.

Before passing on to describing the accumulator of FIGURE 3, I would like to reference the showing of a check valve 62 adapted to cooperate with the inlet 40 to prevent return flow to the pump 22 when the pressure in the space between the bladder 30 and the outer shell 28 has reached a level greater than that coming from the pump 22. This check valve, which could be biased by a spring 63, as seen in FIGURE 3, is designed so that as the pump is supplying pressure to the inlet 40 to be directed to the space between the bladder 30 and shell 28, that such pressure delivery has an unrestricted passage going into this space. The use of this valve allows the accumulator to function regardless of supply failure. In the system shown, this could well mean more brake applications than heretofore available.

As for the structure of FIGURE 3 it is generally similar to that of FIGURE 2 except that the accumulator design is other than the spherical form presented by FIGURE 2. More particularly, the outer shell 28' of FIGURE 3 is of an elongated design which necessitates a bladder 30' having reinforcing ribs 32' of a similar elongated design. The method of attaching the bladder 30' to an end structure 34' is exactly the same as with the attachment shown in FIGURE 2. However, the end structure 34' in FIGURE 3 is shown to be threaded to the outer shell 28' as at 65 in order to provide ready assembly and disassembly of the accumulator. As will be necessitated by such an arrangement, an O-ring or similar type seal 64 is provided to maintain the pressure integrity of the accumulator 24 after assembly. The check valve 62' is radially arranged to better insure that the incoming fluid will not be restricted in any way as it enters the space between the outer shell 28' and the bladder 30'. In addition, the inner chamber 44' is charged in the same fashion as with the structure of FIGURE 2. However, the plug 48' is held within a counterbored opening 66 by a removable sleeve nut 68. Upon assembling the bladder and end structure to the outer shell 28', they are threaded until the band clamp 36' abuts upon an indentation 70 in the outer shell 28' which is similar to an indentation 72 in the spherical shell 28 of FIGURE 2 against which the band clamp 36 rests prior to welding, as at 60.

If desired the plugs 48 and 48' could be made of heat dissolvable plastic set to melt at a predetermined temperature to prevent explosion of the accumulator.

The end closure means 34' is shown to have ears 73 formed about the periphery thereof to, as seen in FIGURE 3, prevent the band clamp 36' from moving to restrict the pressure inlet 40' and/or the discharge port fluid flow, as well as insure clamping of bladder 30' to the closure 34'.

The differences, theoretically, between the accumulators shown in FIGURES 2 and 3 would appear to be primarily in the area of structure subjected to loading as the accumulator is under pressure. More particularly, assuming an 8,000 lb. per sq. in. pressure within the accumulator, the spherical type suggested by FIGURE 2 will take this pressure on a greater diameter than the elongated type of FIGURE 4. This would, theoretically, require greater metal strength in the structure of FIGURE 2 than that of FIGURE 3.

The several practical advantages which flow from this hydro-pneumatic energy storing device are believed to be obvious from the above, and other advantages may suggest themselves to those who are familiar with the art to which this invention relates.

Having thus described the various features of the invention, whose operation is readily obvious, what I claim as new and desire to secure by Letters Patent is:

1. A pressure accumulator comprising:
   an outer shell open at one end;
   a bladder of resilient deformable material, said bladder having a mouth;
   an end structure affixed in the mouth of said bladder by a clamp that surrounds said bladder and holds said bladder to said end structure, said end structure having first, second and third openings therein with said first and third openings leading to peripheral outlets in said end structure and said second opening leading to the interior of said bladder;
   a valve means adapted to allow flow in one direction only through said first opening in said end structure;
   a plug positioned in said second opening of said end structure; and
   means to join said end structure to said outer shell such that a space is provided between said outer shell and said bladder for the receipt of fluid through said first opening which space is in flow communication with said third opening in said end structure.

2. A pressure accumulator according to claim 1 wherein said bladder can be further characterized as having reinforcing ribs therearound.

3. A pressure accumulator according to claim 1 wherein said valve means may be further characterized as including a ball check valve arranged in said first opening to provide unrestriced flow-in from said first opening and adapted to close said first opening when pressure in said space between said outer shell and said bladder is greater than the pressure of fluid entering said first opening 4. A pressure accumulator according to claim 1 wherein said outer shell is characterized as being spherical in form and having an appropriately located indentation for receiving said clamp holding said bladder to said end structure to locate the depth of said end structure in said outer shell.

5. A pressure accumulator according to claim 1 wherein said outer shell is of an elongated form having appropriately spaced indentations on which said clamp about said bladder and end structure abuts to locate and maintain proper spacing of said end structure and bladder within said outer shell.

6. A pressure accumulator according to claim 1 which further comprises a seal in said means joining said end structure to said outer shell to provide pressure integrity for said accumulator.

7. A pressure accumulator according to claim 1 and further comprising a fusible plug for relieving the pressures in said accumulator when said accumulator is subjected to adverse heating conditions to prevent explosion of said accumulator with resulting shrapnel.

8. A pressure accumulator according to claim 1 wherein said end structure has means to prevent motion of said clamp which in cooperation with means on said shell locate said clamp positively and limit the depth of insertion of said bladder and said end structure in said shell.

References Cited by the Examiner
UNITED STATES PATENTS

| | | | |
|---|---|---|---|
| 2,246,667 | 6/1941 | Colman | 138—30 X |
| 2,439,053 | 4/1948 | Moore | 138—30 X |

LAVERNE D. GEIGER, *Primary Examiner.*

H. S. BELL, *Examiner.*